United States Patent
Kaufhold et al.

(10) Patent No.: US 6,355,762 B1
(45) Date of Patent: Mar. 12, 2002

(54) PROCESS FOR THE CONTINUOUS PREPARATION OF MELT PROCESSABLE POLYURETHANES WITH IMPROVED SOFTENING BEHAVIOUR

(75) Inventors: Wolfgang Kaufhold, Köln; Wolfgang Bräuer, Leverkusen; Ulrich Liesenfelder, Bergisch Gladbach; Herbert Heidingsfeld, Frechen; Wolfgang Röhrig, Bergisch Gladbach; Hans-Georg Hoppe, Leichlingen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/572,247

(22) Filed: May 17, 2000

(30) Foreign Application Priority Data

May 26, 1999 (DE) .......................................... 199 24 089

(51) Int. Cl.⁷ .......................... C08G 18/44; B29C 47/38
(52) U.S. Cl. ............................. 528/76; 528/83; 528/85; 264/211.21
(58) Field of Search ............................. 528/76, 83, 85; 264/211.21

(56) References Cited

U.S. PATENT DOCUMENTS

| 3,642,964 A | 2/1972 | Rausch et al. ................. 264/40 |
| 3,963,679 A | 6/1976 | Ullrich et al. .......... 260/75 NE |
| 5,391,682 A | * | 2/1995 | Ogawa et al. ................. 528/59 |

FOREIGN PATENT DOCUMENTS

| CA | 2178056 | 12/1996 |
| DE | 1964834 | 7/1971 |
| DE | 2823762 | 12/1978 |
| DE | 29 01 774 | 7/1980 |
| GB | 1057018 | 2/1967 |

* cited by examiner

Primary Examiner—Rachel Gorr
(74) Attorney, Agent, or Firm—Joseph C. Gil; Aron Preis; James R. Franks

(57) ABSTRACT

A process for the continuous preparation of melt processable polyurethane elastomers having improved softening behavior is disclosed. The process entails reacting a polyisocyanate, a polyol and a chain extender, which have a temperature of at least 170° C., in a static mixer, wherein the reaction mixture is prepared. The reaction mixture is then metered into an extruder into which optional auxiliaries and/or further components are fed.

6 Claims, No Drawings

PROCESS FOR THE CONTINUOUS PREPARATION OF MELT PROCESSABLE POLYURETHANES WITH IMPROVED SOFTENING BEHAVIOUR

The invention relates to a process for the continuous preparation of melt processable polyurethanes in a static mixer with improved softening behaviour.

Thermoplastic polyurethane elastomers (TPU) are by no means new. They are of industrial importance in view of the combination of high-quality mechanical properties and the well known advantages of inexpensive melt processability. Due to the use of different chemical constituents, a wide variation of mechanical properties may be obtained. A review of TPUs, their properties and applications, is given, e.g., in Kunststoffe 68 (1978), pages 819 to 825 or Kautschuk, Gummi, Kunststoffe 35 (1982), pages 568 to 584.

TPUs are synthesised from linear polyols, mostly polyester or polyether polyols, organic diisocyanates and short-chain diols (chain extenders). In addition, catalysts may be added to accelerate the formation reaction. In order to adjust the properties, the constituents may be varied in relatively wide molar ratios. Molar ratios of polyols to chain extenders from 1:1 to 1:12 have proved suitable. As a result, products ranging from 70 Shore A to 75 Shore D are obtained.

The synthesis of melt processable polyurethane elastomers may take place either in steps (prepolymer metering process) or by the simultaneous reaction of all the components in one step (one-shot metering process).

The TPUs may be prepared continuously or batchwise. The most well known industrial production processes are the belt process (GB-A 1 057 018) and the extruder process (DE-A 19 64 834, DE-A 23 02 564 and DE-A 20 59 570). In the extruder process, the starting materials are metered into a screw reactor where polyaddition takes place, and are converted to a uniform granular form. The extruder process is comparatively simple but has the disadvantage that the homogeneity of the products thus produced is not sufficient for many applications in view of the fact that mixing and reaction proceed simultaneously. In addition, the softening behaviour of the TPUs and the moulded articles produced from them is limited. TPUs which melt readily, of the kind used e.g. for hot melt films or sintered products, can be prepared only to a limited extent, if at all, by this process.

Moreover, preparation processes are known from the literature in which the starting materials are initially mixed in a mixing zone at low temperatures at which no polyaddition occurs, and then react together in a reaction zone which has the desired reaction temperature. The mixing and reaction zone is designed preferably as a static mixer.

In DE-A 28 23 762, homogeneous products are obtained by the "one-shot process". In EP-A 747 409, metering takes place by the prepolymer process and homogenous TPUs with improved mechanical properties are obtained.

The object was, therefore, to provide a simple process with which it is possible to prepare homogeneous TPUs with improved softening behaviour in an inexpensive and technically simple manner.

Surprisingly, this object was achieved by preparing TPUs continuously in a static mixer, in which the entire TPU reaction is carried out substantially in the "one-shot metering process", under special process conditions. Homogeneous TPU products with markedly better melting properties are obtained with this process.

The invention provides a process for the continuous preparation of melt processable, homogeneous polyurethane elastomers with improved softening behaviour, in which
one or more polyisocyanates (A) and
a mixture (B) having Zerewitinoff active hydrogen atoms of
B1) 1 to 85 equivalent %, based on the isocyanate groups in (A), of one or more compounds with on average at least 1.8 and at most 2.2 Zerewitinoff active hydrogen atoms per molecule and an average molecular weight $\overline{M}_n$ from 450 to 5000 g/mole,
B2) 15 to 99 equivalent %, based on the isocyanate groups in (A), of one or more chain extenders with on average at least 1.8 and at most 2.2 Zerewitinoff active hydrogen atoms per molecule and a molecular weight from 60 to 400 g/mole, and
0 to 20 wt. %, based on the total quantity of TPU, of further auxiliaries and additives (C),
wherein the components A) and B) are used in an NCO:OH ratio of 0.9:1 to 1.:1,
are homogeneously mixed in a static mixer at a shear rate of >500 $sec^{-1}$ and <50,000 $sec^{-1}$ within a maximum of 1 second, the reaction mixture thus prepared is metered into an extruder, optionally via a second static mixer, and optionally auxiliaries and/or further components are incorporated, characterised in that the polyisocyanate (A) and the mixture (B) each have a temperature of >170° C. and <250° C. the reaction takes place substantially in the first static mixer with a conversion of >90%, based on component A), and the reaction mixture leaves the first static mixer at a temperature of >240° C. and <350° C.

Examples of suitable organic polyisocyanates (A) include aliphatic, cycloaliphatic, araliphatic, heterocyclic and aromatic diisocyanates, as described e.g. in Justus Liebigs Annalen der Chemie, 562, pages 75 to 136.

More specifically, examples include: aliphatic diisocyanates such as hexamethylene diisocyanate, cycloaliphatic diisocyanates such as isophorone diisocyanate, 1,4-cyclohexane diisocyanate, 1-methyl-2,4- and 2,6-cyclohexane diisocyanate and the corresponding isomer mixtures, 4,4'-2,4'- and 2,2'-dicyclohexylmethane diisocyanate and the corresponding isomer mixtures and aromatic diisocyanates such as toluene 2,4-diisocyanate, mixtures of toluene 2,4- and 2,6-diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and/or 2,4'-diphenylmethane diisocyanates, 4,4'-diisocyananatodiphenylethane-(1,2) and 1,5-naphthylene diisocyanate. Diphenyl-methane diisocyanate isomer mixtures with a 4,4'-diphenylmethane diisocyanate content of more than 96 wt. % and in particular 4,4'-diphenylmethane diisocyanate and 1,5-naphthylene diisocyanate are used in preference. The diisocyanates mentioned may be used individually or in the form of mixtures. They may also be used together with up to 15% (based on total diisocyanate) but at most that amount of a polyisocyanate required to obtain a melt processable product. Examples are triphenylmethane-4,4'4''-triisocyanate and polyphenylpolymethylene polyisocyanates.

Linear hydroxyl-terminated polyols with on average 1.8 to 3.0, preferably to 2.2 Zerewitinoff active hydrogen atoms per molecule and with a molecular weight from 450 to 5000 g/mole are used as component B1). Due to production conditions, said polyols often contain small amounts of non-linear compounds. The term "substantially linear polyols" is often, therefore, used. Polyester, polyether, polycarbonate diols or mixtures thereof are preferred.

Suitable polyether diols may be prepared by reacting one or more alkylene oxides with 2 to 4 carbon atoms in the alkylene radical with a starter molecule which contains two active hydrogen atoms in the bound state. Examples of suitable alkylene oxides include: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are used in preference. The alkylene oxides may be used individually, in alternating succession or as mixtures. Examples of suitable starter molecules include: water, aminoalcohols such as N-alkyl diethanolamines, for example, N-methyl diethanolamine, and diols such as ethylene glycol, 1,3-propylene glycol, butane 1,4-diol and hexane 1,6-diol. Optionally, mixtures of starter molecules may also be used. Suitable polyetherols are also the hydroxyl group-containing polymerisation products of tetrahydrofuran. Trifunctional polyethers may also be used in proportions from 0 to 30 wt. %, based on the bifunctional polyethers, but at most in a quantity such that a melt processable product is obtained. The substantially linear polyether diols preferably have molecular weights from 450 to 5000 g/mole. They may be used both individually and in the form of mixtures.

Suitable polyester diols may be prepared, for example, from dicarboxylic acids with 2 to 12 carbon atoms, preferably 4 to 6 carbon atoms, and polyhydric alcohols. Examples of suitable dicarboxylic acids include: aliphatic dicarboxylic acids such as succinic acid, glutaric acid, adipic acid, suberic acid, azelaic acid and sebacic acid and aromatic dicarboxylic acids such as phthalic acid, isophthalic acid and terephthalic acid. The dicarboxylic acids may be used individually or as mixtures, e.g. in the form of a succinic, glutaric and adipic acid mixture. In order to prepare the polyester diols it may optionally be advantageous to use the corresponding dicarboxylic acid derivatives instead of the dicarboxylic acids, such as carboxylic acid diesters with 1 to 4 carbon atoms in the alcohol radical, carboxylic anhydrides or carboxylic acid chlorides. Examples of polyhydric alcohols are glycols with 2 to 10, preferably 2 to 6 carbon atoms such as ethylene glycol, diethylene glycol, butane 1,4-diol, pentane 1,5-diol, hexane 1,6-diol, decane 1,10-diol, 2,2-dimethyl-1,3-propane diol, propane 1,3-diol and dipropylene glycol. Depending on the properties required, the polyhydric alcohols may be used by themselves or optionally in mixture. Esters of carbonic acid with the diols mentioned are also suitable, particularly those with 4 to 6 carbon atoms, such as butane 1,4-diol or hexane 1,6-diol, condensation products of ω-hydroxycarboxylic acids, for example, ω-hydroxycaproic acid and preferably polymerisation products of lactones, for example, optionally substituted caprolactones. Polyester diols used in preference are ethane diol polyadipates, butane 1,4-diol polyadipates, ethane diol-butane-1,4-diol polyadipates, hexane 1,6-diol neopentylglycol polyadipates, hexane 1,6-diol-butane-1,4-diol polyadipates and polycaprolactones. The polyester diols have molecular weights from 450 to 5000 g/mole and may be used individually or in the form of mixtures.

Diols or diamines with on average 1.8 to 3.0, preferably to 2.2 Zerewitinoff active hydrogen atoms per molecule and a molecular weight from 60 to 400 g/mole are used as component B2), preferably aliphatic diols with 2 to 14 carbon atoms such as, e.g., ethane diol, hexane 1,6-diol, diethylene glycol, dipropylene glycol and particularly butane 1,4-diol. Diesters of terephthalic acid with glycols with 2 to 4 carbon atoms are also, however, suitable, such as, e.g., terephthalic acid-bis-ethylene glycol or terephthalic acid-bis-butane 1,4-diol, hydroxyalkylene ethers of hydroquinone such as, e.g., 1,4-di(β-hydroxyethyl)hydroquinone, ethoxylated bisphenols such as, e.g., 1,4-di(β-hydroxyethyl)-bisphenol A, (cyclo)aliphatic diamines, such as, e.g., isophorone diamine, ethylene diamine, 1,2-propylene diamine, 1,3-propylene diamine, N-methylpropylene-1,3-diamine, N,N'-dimethylethylene diamine and aromatic diamines such as, e.g., 2,4-toluene diamine and 2,6-toluene diamine, 3,5-diethyl-2,4-toluene diamine and/or 3,5-diethyl-2,6-toluene diamine and primary mono-, di-, tri- and/or tetraalkylsubstituted 4,4'-diaminodiphenylmethanes. Mixtures of the above-mentioned chain extenders may also be used. In addition, relatively small amounts of triols may also be added.

Moreover, conventional monofunctional compounds may also be used in small amounts, e.g., as chain terminators or release agents. Examples include alcohols such as octanol and stearyl alcohol or amines such as butylamine and stearylamine.

In order to prepare the TPUs, the constituents, optionally in the presence of catalysts, auxiliaries and/or additives, may be reacted preferably in quantities such that the equivalent ratio of NCO groups A) to the sum of the NCO- reactive groups, particularly the OH groups of the low molecular weight diols/triols B2) and polyols B1) is 0.9:1.0 to 1.1:1.0, preferably 0.95:1.0 to 1.10:1.0.

Suitable catalysts according to the invention are conventional tertiary amines well known according to the state of the art, such as, e.g., triethylamine, dimethylcyclohexylamine, -methylmorpholine, N,N'-dimethylpiperazine, 2-(dimethylaminoethoxy)ethanol, diazabicyclo-(2,2,2)-octane and the like, and in particular organic metal compounds such as titanates, iron compounds, tin compounds, e.g. tin diacetate, tin dioctoate, tin dilaurate or the tin dialkyl salts of aliphatic carboxylic acids such as dibutyltin diacetate, dibutyltin dilaurate or the like. Preferred catalysts are organic metal compounds, particularly titanates, iron and/or tin compounds.

Apart from the TPU components and the catalysts, auxiliaries and/or additives (C) may also be added in a quantity of up to 20 wt. %, based on the total quantity of TPU. They may be predissolved in one of the TPU components, preferably in component B1), or optionally metered in after reaction has taken place in a downstream mixing device, e.g., an extruder.

Examples include lubricants such as fatty acid esters, the metal soaps thereof, fatty acid amides, fatty acid ester amides and silicone compounds, antiblocking agents, inhibitors, stabilisers against hydrolysis, light, heat and discoloration, flame retardants, colorants, pigments, inorganic and/or organic fillers and reinforcing agents. Reinforcing agents are, in particular, fibre-like reinforcing agents such as, e.g., inorganic fibres which are produced according to the state of the art and may also be provided with a size. Further details about the auxiliaries and additives mentioned can be obtained from the technical literature, for example, the monograph of J. H. Saunders and K. C. Frisch: "High Polymers", Vol. XVI, Polyurethane, Part 1 and 2, Verlag Interscience Publishers 1962 and 1964, Taschenbuch für Kunststoff-Additive by R. Gächter and H. Müller, Hanser Verlag, Munich 1990, or DE-A-29 01 774.

Other additives which may be incorporated in the TPU are thermoplastics, for example, polycarbonates and acrylonitrile/butadiene/styrene terpolymers, particularly ABS. Other elastomers such as rubber, ethylene/vinyl acetate copolymers, styrene/butadiene copolymers and other TPUs may also be used. Moreover, commercial plasticisers such as phosphates, phthalates, adipates, sebacates and alkylsulfonates are suitable for incorporation.

The preparation process according to the invention is carried out as follows:

Components A) and B) are heated separately, preferably in a heat exchanger, to a temperature between 170° and 250° C. and metered in liquid form simultaneously and continuously into a static mixer preferably with a length/diameter ratio of 5:1 to 20:1, most preferably 8:1 to 14:1.

There the components are mixed homogeneously at a shear rate of 500 to 50,000 sec$^{-1}$ and reacted. Homogenous mixing within the meaning of the invention means that the concentration distribution of the components and of the reaction product in the mixture has a relative standard deviation of less than 5%. The residence time in the static mixer is a maximum of 1 second.

The static mixer is insulated and heated preferably to 200° to 260° C. Static mixers which may be used according to the invention are mentioned in Chem.-Ing. Techn. 52, no. 4, page 285 to 291 and in "Mischen von Kunststoff und Kautschukprodukten", VDI-Verlag, Düsseldorf 1993. Examples include SMX static mixers from Sulzer.

According to the invention, a conversion of >90%, based on the starting component A) is obtained in this static mixer, and the reaction mixture has a temperature of >240° C. and <350° C. on leaving the static mixer.

In a particular embodiment, the reaction mixture is metered, optionally via a second static mixer, directly into a continuously operating kneader and/or extruder (e.g. a ZSK twin-screw kneader) where additional auxiliaries may be incorporated in the TPU at temperatures from 120 to 250° C.

In the second static mixer, if present, a reaction takes place according to the invention only to a very small degree (<10% based on the starting component A)). Pelletising is carried out at the end of the extruder.

The TPU prepared by the process according to the invention may be processed to injection moulded articles, extruded articles, particularly hot melt films, to coating compounds or sintered types and to readily melting coextrusion types such as, e.g., laminating, calendering and powder-slush types. Having good homogeneity, it is characterised mainly by a low softening temperature, as are the moulded articles produced therefrom.

The invention will be explained in more detail on the basis of the examples below.

EXAMPLES

TPU Formulation

| | |
|---|---|
| Polybutane 1,4-diol adipate (molecular weight about 820) | 54 parts by wt. |
| Butane 1,4-diol | 7.4 parts by wt. |
| 4,4'-Diphenylmethane diisocyanate | 37 parts by wt. |
| Ethylene-bis-stearylamide | 0.2 parts by wt. |
| Tin dioctoate | 200 ppm |

Example 1

ZSK Process not According to the Invention (Comparison Example)

The polyester in which 200 ppm (based on polyester) of tin dioctoate were dissolved as catalyst, was heated with the butane diol to 145° C. and metered continuously into the first barrel of a ZSK 83 (Werner/Pfleiderer). 4,4'-Diphenylmethane diisocyanate (130° C.) and ethylene-bis-stearylamide were metered into the same barrel. The first 9 barrels of the ZSK were not heated (quasi adiabatic). Due to the heat of reaction liberated, temperatures of up to 240° C. were obtained. The last 4 barrels were cooled. The screw speed was 270 rpm.

At the end of the screw the hot melt was hauled off as a strand, cooled in a water bath and pelletised.

The results of the relevant product test are given in the table.

Examples 2 to 7

Static Mixer-extruder Process

The above polyester-butane diol mixture with the tin dioctoate was metered continuously into an SMX static mixer[1] from Sulzer.

| | | |
|---|---|---|
| DN18: | length 185 mm: | diameter 18 mm |
| DN32: | length 500 mm: | diameter 32 mm |
| DN4: | length 38 mm: | diameter 4 mm |

At the same time, the 4,4'-diphenylmethane diisocyanate was pumped continuously into the static mixer.

The TPU obtained was metered directly into the first feed point (barrel 1) of an extruder[2].

| | |
|---|---|
| ZSK 83 | (Werner/Pfleiderer) |
| Welding 3500 | (3.5 Dual Worm; Welding Engineers) |
| Continua 37 | (Werner/Pfleiderer) |

The ethylene-bis-stearylamide was metered into the same barrel.

The setting of the ZSK parameters was similar to example 1. The quasi-adiabatic barrel temperature setting showed reaches a value of 1 MPa (the softening temperature) is given in the table below.

Mechanical Testing at Room Temperature

The modulus at 100% elongation was measured on the injection moulded test specimens in accordance with DIN 53 405.

Results:

| Example | Static mixer/ extruder | Throughput [g/min] | Shear rate in static mixer [sec$^{-1}$] | Residence time in static mixer [sec] | Temperature of components A)/B) [° C.] | Temperature at end of static mixer 1 [° C.] | 100% modulus [MPa] | Softening temperature DMA [° C.] |
|---|---|---|---|---|---|---|---|---|
| 1* | ZSK 83 | 10000 | | | 130/145 | | 10.3 | 152 |
| 2* | DN 18/ZSK 83 | 9000 | 2000 | 0.4 | 90/95 | 160 | 10.0 | 153 |
| 3* | DN 18/ZSK 83 | 9000 | 2000 | 0.4 | 155/185 | 200 | a) | a) |
| 4* | DN 32/Welding | 5500 | 140 | 5.5 | 170/170 | 230 | a) | a) |
| 5 | DN 18/Welding | 5500 | 1300 | 0.6 | 180/200 | 285 | 9.9 | 143 |
| 6 | DN 4/Continua | 70 | 1000 | 0.3 | 180/180 | 280 | 10.1 | 139 |
| 7 | DN 18,DN 18/ ZSK 83 | 9100 | 2000 | 0.4 | 190/180 | 282 | 10.8 | 143 |

*Comparison example not according to the invention
a) Static mixer blocked after 30 min; no continuous TPU preparation possible.

that heat of reaction was liberated in the ZSK in comparison example 2; no heat of reaction was liberated in examples 3 and 7.

That means that only in comparison example 2 did a substantial part of the reaction take place not in the static mixer but in the extruder.

The two zones of the Welding extruder were heated to 180° C. The rate of rotation was 110 rpm.

The Continua extruder was heated to 200° C. The rate of rotation was 100 rpm.

At the end of the extruder the hot melt was hauled off as a strand, cooled in a water bath and pelletised.

Preparation of Blown Film
from the TPUs of examples 1 to 7.

The TPU pellets in question were melted in a single screw extruder 30/25D Plasticorder PL 2000-6 from Brabender (metering 3 kg/h; 185 to 205° C.) and extruded through a film blowing die to blown film.

Preparation of the Injection Moulded Articles
from the TPUs of examples 1 to 7.

The TPU pellets in question were melted in an injection moulding machine D 60 (32 screw) from Mannesmann (melt temperature about 225° C.) and formed to sheets (125 mm×50 mm×2 mm).

Dynamic Mechanical Analysis (DMA) as a Function of Temperature

In each case a dynamic mechanical measurement of a test specimen (50 mm×12 mm×2 mm) stamped out of the injection moulded sheet of the products was carried out in the torsion pendulum test as a function of temperature in a manner similar to DIN 53 445.

The measurements were carried out with the RDA 700 from Rheometrics with 1 Hz in the temperature range −125° C. to 200° C. at a rate of heating of 1° C./min. In order to characterise the softening behaviour according to the invention, the temperature at which the storage modulus G'

Homogeneous blown films are obtained from all the products.

If all the parameters of the static mixer process according to the invention are complied with (temperature, shear rate and residence time), products are obtained which have a markedly lower softening temperature compared with the products prepared by the standard ZSK process with the same mechanical properties at room temperature and with the same good film homogeneity.

This melting behaviour is advantageous, particularly for the TPU hot melt film and sintering sector.

We claim:
1. A continuous process for the preparation of thermoplastic, homogeneous polyurethane elastomer having improved softening properties comprising
   (i) obtaining at least one polyisocyanate (A) at a temperature greater than 170° C. and smaller than 250° C. and a mixture (B) at a temperature greater than 170° C. and smaller than 250° C. containing
      B1) 1 to 85 equivalent %, based on the isocyanate groups in (A) of at least one compound having on average at least 1.8 and at most 2.2 Zerewitinoff active hydrogen atoms per molecule and a number average molecular weight of 450 to 5000 g/mol, and
      B2) 15 to 99 equivalent %, based on the isocyanate groups in (A) of at least one chain extender having on average at least 1.8 and at most 2.2 Zerewitinoff active hydrogen atoms per molecule and a molecular weight of 60 to 400 g/mol, and
   (ii) mixing said (A) and (B) homogeneously in an NCO:OH ratio therebetween of 0.9:1 to 1.1:1, in a static mixer at a shear rate greater than 500 sec$^{-1}$ and smaller than 50,000 sec$^{-1}$ during at most 1 second to form a reaction mixture with a conversion greater than 90% based on (A) and at a temperature greater than 240° C. and smaller than 350° C., and
   (iii) metering said reaction mixture into an extruder.
2. The process of claim 1, wherein reaction mixture further comprise up to 20% based on the weight of polyurethane of further auxiliaries and additives.
3. The process of claim 1, wherein B1) is at least one member selected from the group consisting of polyester polyol, polyether polyol and polycarbonate polyol.

4. The process of claim 1, wherein B2) is at least one member selected from the group consisting of ethylene glycol, butane diol, hexane diol, 1,4-di-(β-hydroxyethyl)-hydroquinone and 1,4-di-(β-hydroxyethyl)-bisphenol A.

5. The process of claim 1, wherein A) is an aromatic diisocyanate.

6. The process of claim 5, wherein aromatic diisocyanate is a mixture of diphenylmethane diisocyanate isomers containing more than 96 percent relative to its weight of 4,4'-diphenylmethane diisocyanate.

* * * * *